United States Patent

[11] 3,613,007

| [72] | Inventor | Thomas E. Endres<br>Kokomo, Ind. |
|---|---|---|
| [21] | Appl. No. | 850,538 |
| [22] | Filed | Aug. 15, 1969 |
| [45] | Patented | Oct. 12, 1971 |
| [73] | Assignee | General Motors Corporation<br>Detroit, Mich. |

[54] TWO INTENSITY INDICATOR LAMP CONTROL SYSTEM
4 Claims, 1 Drawing Fig.

[52] U.S. Cl. .................................................. 325/364,
325/455, 315/131, 315/135, 334/86
[51] Int. Cl. ............................................... H04b 1/16,
H01j 7/42, H03j 1/02
[50] Field of Search............................................ 325/364,
455; 340/79, 80, 371, 372; 179/15 ST, 1 G, 1 GP;
334/36, 86; 315/131, 135, 201, 320, 129, 133,
134, 136

[56] References Cited
UNITED STATES PATENTS

| 3,180,999 | 4/1965 | Kuykendall .................. | 315/201 |
|---|---|---|---|
| 3,242,264 | 3/1966 | De Vries....................... | 179/15 ST |
| 3,345,464 | 10/1967 | Gillett .......................... | 325/455 |
| 3,530,501 | 9/1970 | Van Benschoten........... | 315/131 |

Primary Examiner—Robert L. Griffin
Assistant Examiner—James A. Brodsky
Attorneys—E. W. Christen, C. R. Meland and Tim G. Jagodzinski ABSTRACT: A first lamp is alternately illuminated at high and low intensities by variably regulating the bias of a rectifier so as to selectively energize the first lamp through either a second lamp or a resistor. As applied to a stereo radio receiver, the first lamp is a stereo reception indicator lamp and the second lamp is a tuning dial illumination lamp.

PATENTED OCT 12 1971 3,613,007
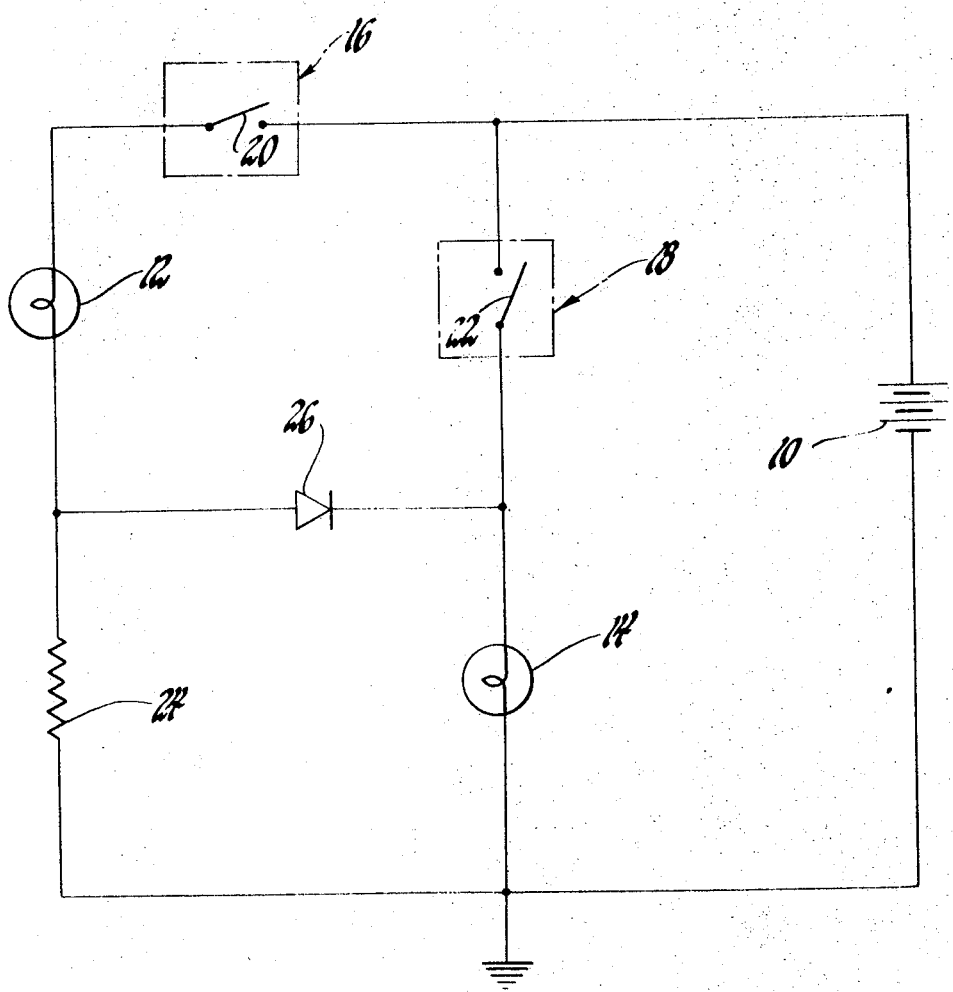
INVENTOR.
Thomas E. Endres
BY
Jim G. Jagodzinski
ATTORNEY

TWO INTENSITY INDICATOR LAMP CONTROL SYSTEM

Disclosure

This invention relates to a condition responsive indicating system, and more particularly to a system for selectively illuminating an indicating lamp at different intensities.

According to one aspect of the invention, a first lamp is energizable in such a manner that the lamp is illuminated at a high intensity. In general, this is accomplished by connecting the first lamp in series with a second lamp so as to energize the first lamp through the second lamp. The first and second lamps are so selected that the rated current of the first lamp is not more than approximately one-third the rated current of the second lamp. Consequently, the second lamp presents negligible resistance to the energizing current of the first lamp so that the first lamp is illuminated at a high intensity and the second lamp is not illuminated at all.

In another aspect of the invention, the first lamp is alternately energizable in such a manner that the lamp is illuminated at either a high intensity or a low intensity. Further, when the first lamp is illuminated at a high intensity the second lamp is not illuminated, and when the first lamp is illuminated at a low intensity the second lamp is also illuminated. Generally, this is accomplished by connecting a rectifier in series between the first and second lamps and by connecting a resistor in series with the first lamp only. In one mode of operation, the rectifier is forward biased so as to energize the first lamp through the second lamp to illuminate the first lamp at a high intensity but not to illuminate the second lamp. In another mode of operation, the rectifier is reversed biased so as to energize the first lamp through the resistor thereby to illuminate the first lamp at a low intensity and also to illuminate the second lamp. The exact intensity of the low intensity illumination of the first lamp is determined by the precise resistance of the resistor.

According to a further aspect of the invention, the illumination of the first lamp is responsive to a first condition and the intensity of the illumination of the first lamp is responsive to a second condition. Generally, this is accomplished by connecting a first condition responsive device in series with the first lamp and a second condition responsive device in series with the second lamp. The first condition responsive device regulates the illumination of the first lamp in response to the first condition, and the second condition responsive device regulates the intensity of the illumination of the first lamp in response to the second condition. In addition, the second condition responsive device regulates the illumination of the second lamp in response to the second condition.

One particularly advantageous application of the invention is in a radio receiver capable of operating in a stereo reception mode. In such an application, the first lamp is a stereo reception indicator lamp and the second lamp is a tuning dial illumination lamp. Further, the first condition responsive device senses the operation of the radio receiver in a stereo reception mode and the second condition responsive device senses the location of the radio receiver in a darkened environment. In operation, the first condition responsive device enables the stereo indicator lamp to be illuminated at an intensity determined by the second condition responsive device when the radio receiver is operated in a stereo reception mode. Hence, when the radio receiver is located in a lighted environment, the second condition responsive device illuminates the stereo indicator lamp at a high intensity but does not illuminate the dial illumination lamp. Conversely, when the radio receiver is located in a darkened environment, the second condition responsive device illuminates the stereo indicator lamp at a low intensity and also illuminates the dial illumination lamp. Thus, the stereo indicator lamp is illuminated at a high intensity in a lighted environment so as to enable the lamp to be readily seen, and is illuminated at a low intensity in a darkened environment so as to reduce the glare of the lamp. Further, the dial illumination lamp is illuminated only in a darkened environment thereby to conserve power at all other times.

These and other aspects and advantages of the invention will become more apparent by reference to the following detailed description of a preferred embodiment when considered in conjunction with the accompanying drawing, which is a schematic diagram of an indicator lamp control system incorporating the principles of the invention.

Referring to the drawing, an indicator lamp control system includes a direct current voltage source which may be conveniently provided by a conventional battery 10 having positive and negative terminals. The negative terminal of the battery 10 is connected directly to ground. Further, the illustrated control system includes first and second incandescent lamps 12 and 14. As is characteristic of incandescent lamps, the illuminative intensity of the first and second lamps 12 and 14 is generally a direct function of both the voltage applied across and the current applied through the lamps 12 and 14. However, for reasons which will be more fully explained later, the lamps 12 and 14 are selected such that the rated current of the first lamp 12 is not less than approximately one-third the rated current of the second lamp 14. The rated current of an incandescent lamp is the amount of current drawn by the lamp at the rated voltage of the lamp.

A first condition responsive device 16 is connected in series between one side of the first lamp 12 and the positive terminal of the battery 10. A second condition responsive device 18 is connected in series between one side of the second lamp 14 and the positive terminal of the battery 10. The first and second condition responsive devices 16 and 18 are schematically depicted to be first and second control switches 20 and 22, respectively, which are operable between a normally open position and a closed position. A resistor 24 is connected in series between the other side of the first lamp 12 and ground, while the other side of the second lamp 14 is connected directly to ground. A rectifier is provided by a diode 26 having an anode and a cathode. The anode of the diode 26 is connected to the junction between the first lamp 12 and the resistor 24. The cathode of the diode 26 is connected to the junction between the second condition responsive device 18 and the second lamp 14. Thus, the diode 26 is effectively connected in series between the first and second lamps 12 and 14.

It is to be noted that the illustrated indicator lamp control system provides first, second and third networks or current paths effectively connected across the battery 10. The first network is provided by the first condition responsive device 16, the first lamp 12 and the resistor 24. The second network is provided by the second condition responsive device 18 and the second lamp 14. The third network is provided by the first condition responsive device 16, the first lamp 12, the diode 26 and the second lamp 14.

In operation, the first control switch 20 of the first condition responsive device 16 is moved from the normally open position to the closed position. In the closed position, the control switch 20 applies a voltage from the battery 10 across the first lamp 12 so as to develop an energizing current which flows through the first lamp 12 to illuminate it. When the second control switch 22 of the second condition responsive device 18 is in the normally open position, the diode 26 is forward biased by the voltage applied across the resistor 24. In the forward biased condition, the diode 26 provides a very low resistance through which the first lamp 12 is effectively connected in series with the parallel combination of the resistor 24 and the second lamp 14. In this respect, it has been found that when two incandescent lamps are connected in series, where the rated current of one lamp is not less than approximately three times the rated current of the other lamp, the lamp having the larger rated current presents negligible resistance to an energizing current flowing through the lamp having the smaller rated current. Accordingly, since the rated current of the second lamp 14 is not less than approximately three times the rated current of the first lamp 12, the second lamp 14 presents negligible resistance to the energizing current flowing through the first lamp 12 as opposed to the substantial resistance presented by the resistor 24. Consequently, almost all the energizing current flows through the second lamp 14 rather than the resistor 24. Therefore, substantially the full voltage of the battery 10 (except for a small voltage drop across the diode 26) is applied across the first lamp 12 so that the energizing current is approximately equal to the rated current of the first lamp 12 thereby to illuminate the first lamp 12 at a relatively high intensity. Conversely, since the second lamp 14 presents negligible resistance to the energizing current flowing through the first lamp 12, the second lamp 14 is not illuminated at all.

When the second control switch 22 of the second condition responsive device 18 is in the closed position, substantially the full voltage of the battery 10 is applied across the second lamp 14 so as to develop an energizing current which flows through the second lamp 14 to illuminate it. The energizing current is approximately equal to the rated current of the second lamp 14 so that the lamp 14 is illuminated at a relatively high intensity. Further, the voltage applied across the second lamp 14 reverse biases the diode 26. In the reverse biased condition, the diode 26 acts as an open circuit to effectively disconnect the first lamp 12 from the second lamp 14. Hence, the energizing current flowing through the first lamp 12 no longer flows through the second lamp 14, but rather flows through the resistor 24. However, since the resistor 24 presents a substantial resistance to the energizing current, less than the full voltage of the battery 10 is applied across the first lamp 12. Hence, the energizing current is less than the rated current of the first lamp 12 so that the first lamp 12 is illuminated at a relatively low intensity. The exact intensity of the low intensity illumination of the first lamp 12 is an inverse function of the resistance of the resistor 24. Therefore, the intensity may be precisely controlled by properly selecting the resistance of the resistor 24.

It will now be apparent that when the first control switch 20 is in the closed position and the second control switch 22 is in the open position, the first lamp 12 is energized through the third network at a relatively high intensity. Conversely, when the first control switch 20 is in the closed position and the second control switch 22 is in the closed position, the first lamp 12 is energized through the first network at a relatively low intensity and the second lamp 14 is energized through the second network at a relatively high intensity.

In a preferred embodiment of the invention, the illustrated indicator lamp control system is applied to a conventional radio receiver capable of operating in a stereo reception mode. In such an application, the battery 10 may be any suitable direct current voltage source. The first lamp 12 is a stereo reception indicator lamp and the second lamp 14 is a tuning dial illumination lamp. The first condition responsive device 16 is a conventional stereo reception detector for determining when the radio receiver is operated in a stereo reception mode. The stereo reception detector 16 may be provided by any suitable frequency sensitive device operable in response to the 19 KH$_z$ characteristic stereo signal received when the radio receiver is operated in a stereo reception mode. The second condition responsive device 18 is a conventional light detector for determining when the radio receiver is located in a darkened environment. The light detector 18 may be provided by any suitable light sensitive device operable in response to the relative absence of light when the radio receiver is located in a darkened environment.

In operation the stereo reception detector 16 is responsive to the operation of the radio receiver in a stereo reception mode to drive the first control switch 20 to the closed position to illuminate the stereo indicator lamp 12. Further, the light detector 18 is responsive to the location of the radio receiver in a lighted environment to drive the second control switch 22 to the open position to illuminate the stereo indicator lamp 12 at a high intensity, but not to illuminate the dial illumination lamp 14. Conversely, the light detector 18 is responsive to the location of the radio receiver in a darkened environment to drive the second control switch 22 to the closed position to illuminate the stereo indicator lamp at a low intensity, and also to illuminate the dial illumination lamp 14. Hence, the stereo indicator lamp 12 is illuminated at a high intensity in a lighted environment to enable the lamp to be readily seen, and is illuminated at a low intensity in a darkened environment to reduce the glare of the lamp. In addition, the dial illumination lamp 14 is illuminated only in a darkened environment thereby to conserve power at all other times.

In an alternate embodiment of the invention, the illustrated indicator lamp control system is applied to a stereo radio receiver mounted within an automotive vehicle. In such an application, the battery 10 is the conventional vehicle battery, and the second condition responsive device 18 is the conventional vehicle light switch. Hence, during the daytime, the vehicle light switch 18 is normally turned off so that the second control switch 22 is in the open position. Accordingly, the stereo indicator lamp 12 is illuminated at a high intensity so as to enable the lamp 12 to be readily observed by the vehicle driver. However, during the nighttime, the vehicle light switch 18 is normally turned on so that the second control switch 22 is in the closed position. Accordingly, the stereo indicator lamp 12 is illuminated at a low intensity so as to reduce the glare of the lamp 12 as observed by the vehicle driver. Further, during the nighttime, the dial illumination lamp 14 is illuminated to light the tuning dial of the radio receiver.

In an indicator lamp control system constructed in accordance with the preferred embodiment of the invention illustrated in the drawing, the following circuit components were found to yield satisfactory results:

It will now be readily appreciated that the invention provides a simple and reliable indicator lamp control system which is particularly, though not exclusively, applicable to a radio receiver capable of operating in a stereo reception mode. However, it is to be understood that the preferred embodiment of the invention disclosed herein is shown for illustrative purposes only and that various modifications and alterations may be made thereto without departing from the spirit and scope of the invention. Thus, the first and second condition responsive devices 16 and 18 may be sensitive to virtually any conditions which are capable of being detected. Similarly, the condition responsive devices 16 and 18 need not be connected to a single voltage source but could each be connected to a separate voltage source.

| | |
|---|---|
| Battery 10 | 14 volts |
| Stereo indicator lamp 12 | 2182D (80 ma.) |
| Dial illumination lamp 14 | 1893 (330 ma.) |
| Resistor 24 | 150 ohms |
| Diode 26 | 1N456A |

Further, the first condition responsive device 16 including the first control switch 20 could be eliminated altogether provided it was desired to have the first lamp 12 continuously illuminated at either a high or a low intensity.

What is claimed is:

1. An indicating system comprising: a voltage source having first and second terminals; first and second incandescent lamps each having first and second terminals, the rated current of the first lamp related to the rated current of the second lamp such that the second lamp presents negligible resistance to an energizing current approximately equal to the rated current of the first lamp, the first terminal of the first lamp connected to the first terminal of the voltage source and the second terminal of the second lamp connected to the second terminal of the voltage source; a resistor connected between the second terminal of the first lamp and the second terminal of the voltage source; a rectifier connected between the second terminal of the first lamp and the first terminal of the second lamp; and switching means connected between the first terminal of the second lamp and the first terminal of the voltage source, the switching means operable in a first position to forward bias the rectifier to energize the first lamp with an energizing current approximately equal to its rated current through the second lamp which provides negligible resistance to the energizing current so that the first lamp is illuminated at a relatively high intensity, and the switching means operable in the second position to reverse bias the rectifier to energize the first lamp with an energizing current considerably less than its rated current through the resistor which provides a substantial resistance to the energizing current so that the first lamp is illuminated at a relatively low intensity.

2. An indicating system comprising: a voltage source; a first network including first switching means, a first incandescent lamp, and a resistor effectively connected in series across the voltage source; a second network including second switching means and a second incandescent lamp effectively connected in series across the voltage source; and a third network including the first switching means, the first incandescent lamp, a rectifier and the second incadescent lamp effectively connected in series across a voltage source; the first and second switching means each having a first position and a second position, the first switching means operable in the second position and the second switching means operable in the first position to forward bias the rectifier to energize the third network from the voltage source, and the first switching means operable in the second position and the second switching means operable in the second position to reverse bias the rectifier to energize the first and second networks from the voltage source; the first and second incandescent lamps each having different rated currents such that the rated current of the second lamp is not less than approximately three times the rated current of the first lamp, the energization of the third network thereby producing a voltage across the first lamp which is approximately equal to the nominal voltage of the voltage source minus the voltage drop across the rectifier and the second incandescent lamp to illuminate the first lamp at a relatively high intensity due to the negligible resistance provided by the second lamp, the energization of the first network thereby producing a voltage across the first lamp which is approximately equal to the nominal voltage of the voltage source minus the voltage drop across the resistor to illuminate the first lamp at a relatively low intensity due to the substantial resistance presented by the resistor, and the energization of the second network thereby producing a voltage across the second lamp which is approximately equal to the nominal voltage of the voltage source to illuminate the second lamp at a relatively high intensity.

3. An indicating system comprising: a voltage source having first and second terminal across which a voltage is provided; a first incandescent lamp having a first rated current and a second incandescent lamp having a second rated current, the first rated current being not more than one-third the second rated current; the first and second incandescent lamps each having first and second terminals, the second terminal of the second lamp connected to the second terminal of the voltage source; a rectifier connected between the second terminal of the first lamp and the first terminal of the second lamp; a resistor connected between the second terminal of the first lamp and the second terminal of the voltage source; and first and second switching means each having first and second positions, the first switching means connected between the first terminal of the first lamp and the first terminal of the voltage source, the second switching means connected between the first terminal of the second lamp and the first terminal of the voltage source, the first switching means operable in the second position and the second switching means operable in the first position to forward bias the rectifier to energize the first lamp with an energizing current approximately equal to its rated current through the second lamp which provides negligible resistance to the energizing current so that the first lamp is illuminated at a relatively high intensity; and the first switching means operable in the second position and the second switching means operable in the second position and the second switching means operable in the second position to reverse bias the rectifier to energize the first lamp and the second lamp, the first lamp energized with an energizing current considerably less than its rated current through the resistor which provides a substantial resistance to the energizing current so that the first lamp is illuminated at a relatively low intensity, and the second lamp energized with an energizing current approximately equal to its rated current so that the second lamp is illuminated at a relatively high intensity.

4. In a radio receiver capable of operating in a stereo reception mode, an indicating system comprising: a voltage source having first and second terminals across which a voltage is provided; a first incandescent lamp for indicating that the radio receiver is operating in a stereo reception mode when illuminated, the first lamp having first and second terminals and having a first rated current; a second incandescent lamp for lighting the tuning dial of the radio receiver when illuminated, the second lamp having first and second terminals and a second rated current, the second terminal of the second lamp connected to the second terminal of the voltage source; a rectifier connected between the second terminal of the first lamp and the first terminal of the second lamp; a resistor connected between the second terminal of the first lamp and the second terminal of the voltage source; first condition responsive switching means including a first control switch having open and closed portions, the first control switch connected between the first terminal of the first lamp and the first terminal of the voltage source and shiftable from the open position to the closed position in response to operation of the radio receiver in a stereo reception mode thereby to apply a voltage from the voltage source to the first lamp; second condition responsive means including a second control switch having opened and closed positions, the second control switch connected between the first terminal of the second lamp and the first terminal of the voltage source and shiftable from the opened position to the closed position in response to the location of the radio receiver in the darkened environment thereby to apply a voltage from the voltage source to the second lamp; the second rated current of the second incandescent lamp being not less than approximately three times the first rated current of the first incandescent lamp, the voltage applied to the first lamp by the first condition responsive switching means thereby forward biasing the rectifier to energize the first lamp with an energizing current approximately equal to its rated current through the second lamp which provides negligible resistance to the energizing current so that the first lamp is illuminated at a relatively high intensity, and the voltage applied to the second lamp by the second condition responsive switching means thereby reverse biasing the rectifier to energize the first lamp with an energizing current considerably less than its rated current through the resistor which provides a substantial resistance to the energizing current so that the first lamp is illuminated at a relatively low intensity and to energize the second lamp with an energizing current approximately equal to its rated current so that the second lamp is illuminated at a relatively high intensity.

PO-1050
(5/69)

UNITED STATES PATENT OFFICE
CERTIFICATE OF CORRECTION

Patent No. __3,613,007__  Dated __October 12, 1971__

Inventor(s) __Thomas E. Endres__

It is certified that error appears in the above-identified patent and that said Letters Patent are hereby corrected as shown below:

Column 4, line 30, insert the table as listed on lines 45-51 after line 29, "were found to yield satisfactory results:".

Column 6, line 7, delete "the second switching means operable in the second position"; line 32, "portions" should be -- positions --.

Signed and sealed this 16th day of May 1972.

(SEAL)
Attest:

EDWARD M. FLETCHER, JR.
Attesting Officer

ROBERT GOTTSCHALK
Commissioner of Patents